3,049,143
SAFETY VALVE FOR PULSATING LIQUID PRESSURE SYSTEMS
Elmer J. Hellems, Quinwood, and Edward O'Dell, Crichton, W. Va.
Filed May 12, 1960, Ser. No. 28,652
1 Claim. (Cl. 137—390)

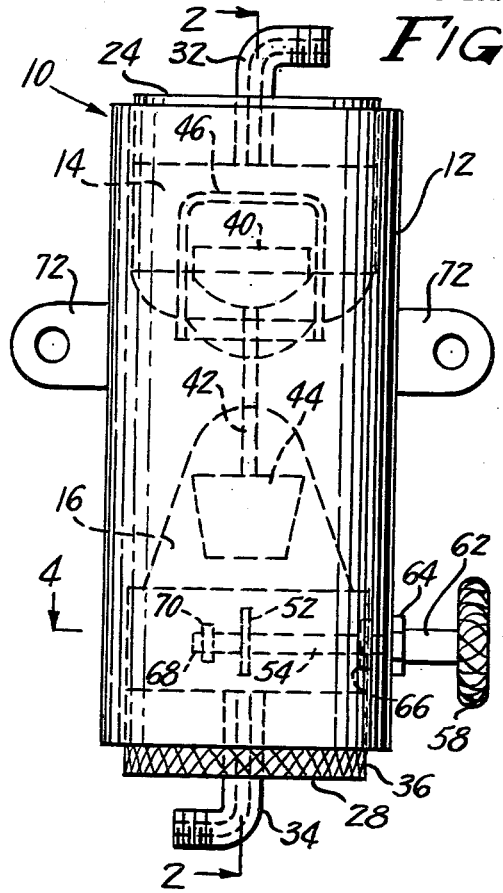
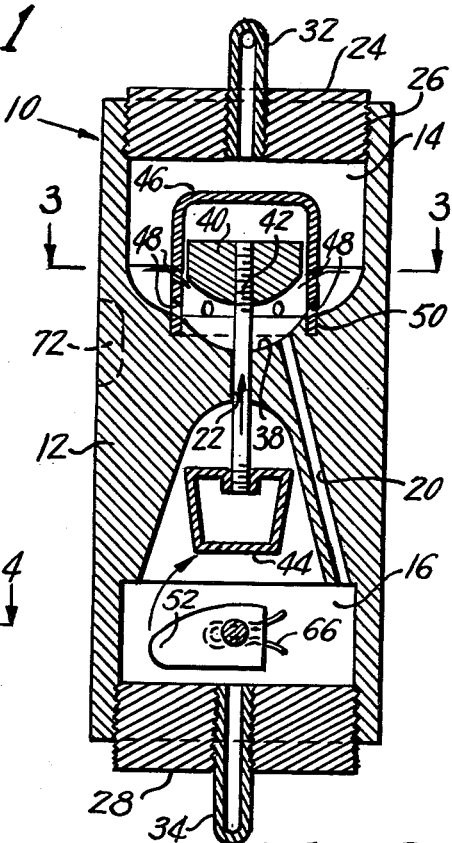
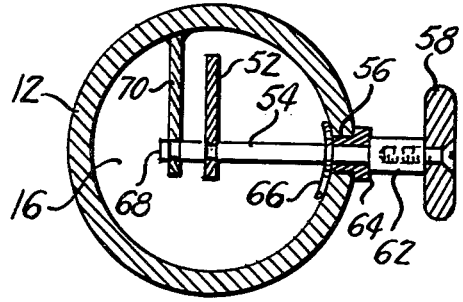
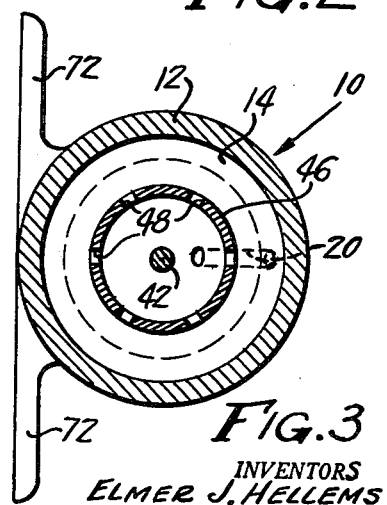
Aug. 14, 1962 — E. J. HELLEMS ET AL — 3,049,143
SAFETY VALVE FOR PULSATING LIQUID PRESSURE SYSTEMS
Filed May 12, 1960
FIG. 1
FIG. 2
FIG. 4
FIG. 3
INVENTORS
ELMER J. HELLEMS
EDWARD O'DELL
BY Gustav Miller
ATTORNEY

United States Patent Office 3,049,143
Patented Aug. 14, 1962

This invention relates to a safety valve for liquid pressure systems of the pulsating type, for example, hydraulic brake systems for automobiles.

It is an object of the invention to provide a valve which will automatically shut off the flow of the liquid medium from the master cylinder should a leak occur in a line leading to one of the braking units thereby permitting the remaining braking units to continue to operate.

A further object of the invention resides in providing a safety valve having means to accelerate the closing of the valve when a leak occurs in a line so there will be a minimum loss of liquid from the system.

A still further object of the invention resides in providing means for refilling the broken line with liquid when the leak has been repaired whereby the valve is opened and the line is restored to full operative condition.

Another object of the invention resides in providing a device of the above-mentioned character which is simple and durable in construction, efficient and reliable in operation and inexpensive to manufacture.

A further object of this invention is to provide a safety valve having a valve head which will close quickly in case a leak develops in the pressure line to the brake, but which will not be affected by the surging or pulsation of the liquid in normal operation.

A still further object of this invention is to provide a safety valve which can be readily restored to operative position once the leak is repaired, without the necessity of opening the valve body to do so, but wherein the valve body can be readily opened, if necessary, and as easily reclosed.

Other objects and advantages of the invention will be apparent during the course of the following description.

In the accompanying drawing forming a part of this specification and in which like numerals are employed to designate like parts throughout the same, FIG. 1 is an elevational view of the safety device of this invention, showing interior details in phantom view;

FIG. 2 is a sectional view on line 2—2 of FIG. 1;

FIG. 3 is a sectional view on line 3—3 of FIG. 1; and

FIG. 4 is a sectional view on line 4—4 of FIG. 1.

This application is a continuation-in-part of application Serial No. 811,636 filed May 7, 1959, now abandoned, for Safety Device for Hydraulic Brake Lines.

Referring in greater detail to the drawing wherein similar reference characters refer to similar parts, there is shown at 10 the safety valve of this invention including a valve body consisting of a somewhat cylindrical block 12 having an entrance liquid chamber 14 at one end and an exit liquid chamber 16 at the other end connected together by a straight liquid passage 20, and also a valve stem bore 22.

An entrance closure plug 24 is threaded at 26 into the entrance chamber 14, and an exit plug 28 is threaded at 30 into the exit chamber 16, each plug being provided with an elbow port 32 and 34 for suitable connection to liquid pressure lines, in this case, the hydraulic pressure line leading from the master cylinder to the individual brake cylinder. As shown, one or both plugs may be knurled as at 36 to facilitate positioning or removing the plugs, other equivalent means of course being usable, such as spanner wrench indentations or the like.

The upper end of the straight liquid passage 20 between chambers 14 and 16 is located in a centrally located valve seat 38 arranged to be closed by a valve 40, of substantial size shaped preferably somewhat as shown, a valve stem 42 being threaded thereto and extending through the stem bore 22 into the lower chamber 16, a float 44 being threaded at the lower end within the exit chamber 16. When the lower chamber 16 is full of liquid, the float 44 supports the valve 40 in open position, so that liquid may flow freely through passage 20 between the upper chamber 14 and the lower chamber 16, in either direction.

To prevent the surge of the liquid from the port 32 from affecting the operation of valve 40, an umbrella 46 is placed thereover as shown. This umbrella 46 consists of an inverted somewhat cylindrical member open at its bottom, of an internal diameter somewhat larger than the valve 40, and having its bottom edge resting on the floor, or in a circular recess in the floor of the upper chamber 14 about the valve seat 38.

The umbrella 46 is perforated in several places at 48 adjacent its bottom edge 50, the perforations 48 being generally at or below the bottom edge of the valve 40, so that liquid may freely reach the passage 20 through the valve seat 38. It will be noted that the umbrella 46 allows ample room for the valve 40 to move up or down therewithin when necessary.

Below and in the path of the downward movement of the float 44 there is located a cam 52 mounted on a control rod 54 journaled through a bushing 56 through a side wall of lower chamber 16 and having a knurled handle knob 58 fixed on the end thereof, spaced from the outside of the chamber 16 by a sleeve 60 abutting between the knob 58 and a flange 64 on the bushing 56. A cotter pin 66 through the rod 54 holds the rod in position within the chamber 16 with its reduced end 68 extending through a bearing formed in a stanchion 70 secured, as by spot welding or otherwise, to a wall of the chamber 16.

Extending from the block 12 are a pair of ears 72 serving as a convenient means for mounting the block 12 in any suitable location.

In operation, the safety valve 10 is mounted between the master hydraulic brake cylinder of a vehicle or the article on which the brake cylinder is used, and the brake actuating cylinder at the brake, and the hydraulic pressure line between the master cylinder and the brake is cut as close to the master cylinder as possible, and the portion from the master cylinder is connected to the valve port 32 and the portion to the brake is connected to the port 34, there being an individual safety valve 10 provided for each pressure line to each individual brake. As long as the pressure line to the brake remains in good operative condition, the safety valve 10 is inoperative, but should a leak ever develop between the safety valve 10 and the brake, or should the brake cylinder leak and the fluid get lost, the float 44 will drop down, thereby closing the valve 44 against the valve seat 38, thus preventing any more fluid from passing through the port 34 to the leaking portion, thus permitting the other brakes to remain operative.

When the leak has been repaired, the closed valve 40 is lifted from its seat 38 by manually rotating the handle knob 58 to actuate the cam 52 against the bottom of float 44, lifting and holding valve 44 in open position until the liquid has completely filled the bottom chamber 16 and the pressure lines, whereupon the float will maintain the valve open, and the cam is manually restored to the inoperative position shown in FIG. 2.

As the brake pedal is used in normal operation, liquid pressure will pulse or surge through the valve to the brake in the normal manner. Such pulsation or surging will not affect the operation of the valve 40 because the unbrella 46 prevents the surge of the liquid from affecting the valve 44, and the position of the bottom of the passage 20 below the normal float position of the float 44 prevents the surge of the pressure liquid from affecting the float. The passage 20 is in a single straight line, and thus simplifies the manufacturing process, for the passage 20 can be easily drilled through due to the absence of any curves or angles therein. That it is at a slight angle from the vertical in no way affects its operation, and of course, it is of a sufficient diameter to permit the liquid to pass freely therethrough in either direction, although obviously, an additional passage or two may be provided, if desirable.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A safety valve device for liquid pressure systems of the pulsating type comprising a body having an open upper liquid chamber therein, said upper chamber having a concave floor, a valve seat recessed into said concave floor, an open lower liquid chamber spaced below said upper chamber, said lower chamber having a deeply concave roof, each said chamber having a ported closure plug, a stem bore extending vertically between said chambers through said valve seat and said concave roof, a valve stem slidably extending through said stem bore, a valve fixedly secured on the upper end of said stem in said upper chamber and a float fixedly secured on the lower end of said stem in said lower chamber, said float normally floating within the deep concavity of said lower chamber roof when said chambers are full of liquid, a straight line liquid passage separate from said stem bore connecting said upper chamber through said valve seat to an entrance in said lower chamber below the floating position of float, said float in floating position maintaining said valve above said valve seat and permitting said valve to drop on said valve seat and close said connecting liquid passage when said lower chamber is emptied of liquid, a surge reducing umbrella, open at its bottom edge, secured to said upper chamber concave floor enveloping said valve when in open position, and a manually controllable cam below and in the path of said float for lifting said float to reopen said valve after it has been closed.

References Cited in the file of this patent

UNITED STATES PATENTS

| | | |
|---|---|---|
| 918,314 | Griffen | Apr. 13, 1909 |
| 932,153 | Martin | Aug. 24, 1909 |
| 1,334,821 | Turnbull | Mar. 23, 1920 |
| 1,477,916 | Sikes et al. | Dec. 18, 1923 |
| 1,831,318 | O'Neill et al. | Nov. 10, 1931 |
| 2,058,595 | Klein | Oct. 27, 1936 |
| 2,614,003 | Brousseau et al. | Oct. 14, 1952 |
| 2,655,171 | Cantor | Oct. 13, 1953 |

FOREIGN PATENTS

| | | |
|---|---|---|
| 779,383 | France | Jan. 14, 1935 |